United States Patent Office 3,636,105
Patented Jan. 18, 1972

3,636,105
1-FLUOROACETYLAMINO-2,2,2-TRICHLORO-ETHYL UREAS
Christa Fest, Wuppertal-Elberfeld, and Gunther Hermann, Leverkusen, Germany, assignors to Farbenfabriken Bayer Aktiengesellschaft, Leverkusen, Germany
No Drawing. Filed Nov. 12, 1969, Ser. No. 876,143
Claims priority, application Germany, Nov. 22, 1968,
P 18 10 293.7
Int. Cl. C07c *127/00*
U.S. Cl. 260—553 R  7 Claims

ABSTRACT OF THE DISCLOSURE 1-fluoroacetylamino-2,2,2-trichloro-ethyl ureas, i.e. N-(1-fluoroacetylamino - 2,2,2 - trichloro-eth-1-yl)-N'-(alkyl, phenyl, alkoxyphenyl and chloro-substituted phenyl)-ureas, which possess selective rodenticidal properties, and which may be produced by conventional methods.

---

The present invention relates to and has for its objects the provision for particular new 1-fluoroacetylamino-2,2,2-trichloro-ethyl ureas, i.e. N-(1-fluoroacetylamino-2,2,2-trichloro-eth-1-yl)-N'-(alkyl, phenyl, alkoxyphenyl and chloro-substituted phenyl)-ureas, which possess valuable selective rodenticidal properties, active compositions in the form of mixtures of such compounds with solid and liquid dispersible carrier vehicles, and methods for producing such compounds and for using such compounds in a new way, especially for combating rodents, with other and further objects becoming apparent from a study of the within specification and accompanying examples.

It is known in this regard to use, for the control of short-tailed mice, rodenticides such as sodium monofluoroacetate (A), monofluoroacetamide (B), 1,2,3,4,10,10-hexachloro-exo-6,7-epoxy - 1,4,4a,5,6,7,8,8a - octahydro-1,4,5,8 - endo, endodimethane-naphthalene, (C), chlorinated camphene (D), and 2-chloro-4-methyl-6-dimethylamino-pyridine (E). All these substances are about equally toxic to all warm-blooded animals, for example to useful kiflnds of birds, and therefor when used against short-tailed mice they represent a serious danger tot he wildlife community.

It is furthermore known that fluoroacetylated aminals such as 1 - dimethylamino-1-fluoroacetylamino-2,2,2-trichloroethane (F), and 1-methylamino - 1 - fluoroacetyl-amino-2,2,2-trichloro-ethane (G), can be used for the control of Microtinae, i.e. short tailed mice (cf. German Pat. 1,218, 460). These substances, too, are relatively toxic to birds.

It has now been found, in accordance with the present invention, that the particular new 1-fluoroacetylamino-2,2,2-trichloro-ethyl ureas, of the formula

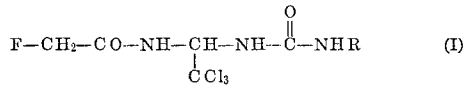

in which R is alkyl of 1–4 carbon atoms, phenyl, alkoxyphenyl having 1–4 carbon atoms in the alkoxy moiety and chloro-substituted phenyl, exhibit strong, especially selective, rodenticidal properties, e.g. with respect to short-tailed mice.

It has been furthermore found, in accordance with the present invention, that the compounds of Formula I above may now be produced by the process which comprises reacting fluoroacetylamino-trichloromethyl-aminomethane of the formula

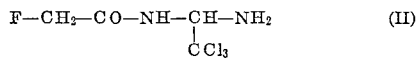

with an isocyanate of the formula

R—NCO   (III)

in which R is the same as defined above.

It is very surprising that the active compounds of Formula I above according to the present invention exhibit a higher specificity with regard to their toxicity to warm-blooded animals, i.e. with specific regard to rodents, than the previously known rodenticides. Therefore, the instant compounds according to the present invention represents a valuable contribution to the art.

When methyl isocyanate is used, the reaction course according to the present invention can be represented by the following formula scheme

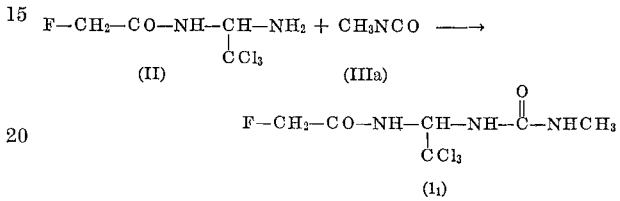

The active compounds usable according to the present invention are clearly characterized by the Formula I above.

Advantageously, in accordance with the present invention, in the various formulae herein:

R represents straight and branched chain lower alkyl hydrocarbon of 1–4 carbon atoms such as methyl, ethyl, n- and iso-propyl, n-, iso-, sec.- and tert.-butyl, and the like, especially $C_{1-3}$ or $C_{1-2}$ alkyl;

Phenyl; alkoxyphenyl having 1–4 carbon atoms in the alkoxy moiety such as 2-, 3- and 4-methoxy, ethoxy, n- and isopropoxy, n-, iso-, sec.- and tert.-butoxy-phenyl, and the like, especially $C_{1-3}$ or $C_{1-2}$ alkoxyphenyl, and more especially 4-$C_{1-4}$ or $C_{1-3}$ or $C_{1-2}$ alkoxy-phenyl; or Chloro-substituted phenyl such as 2-, 3- and 4- mono, and 2,3-, 2,4-, 2,5-, 2,6-, 3,4- and 3,5-di, chloro-phenyl, especially dichlorophenyl, and more especially 2,4-dichloro-phenyl.

Preferably, R is $C_{1-3}$ or $C_{1-2}$ alkyl; or phenyl; or $C_{1-3}$ or $C_{1-2}$ alkoxy-phenyl; or mono to di chloro-phenyl.

In particular, R is $C_{1-2}$ alkyl; or phenyl; or 4-($C_{1-3}$ alkoxy)-phenyl; or 2,4-dichloro-phenyl.

The starting materials of Formulae II and III above usable for the process are already known. The isocyanates usable as reactants are clearly characterized by Formula III above.

The production reaction according to the present invention is expediently carried out in the presence of a solvent (this term includes a mere diluent) which may be varied according to the particular reactants. The chiefly suitable solvents include chlorinated hydrocarbons, such as carbon tetrachloride, chloroform, methylene chloride, chlorobenzene, and the like.

A tertiary amine, such as triethyl amine, trimethyl amine, and the like, may expediently be added in order to accelerate the reaction.

The reaction proceeds exothermally. In general it is carried out at temperatures from substantially between about 0–180° C., and preferably between about 10–100° C.

Approximately equimolar amounts of the starting materials are generally used. The use of an excess of one or other of the reactants seems to give no particular advantage.

The production process may be carried out in a conventional manner by mixing the reaction components, expediently with the use of a solvent. Working up may also be carried out in customary manner, for example, by filtration and subsequent concentration of the filtrate.

Advantageously, the active compounds of Formula I above according to the present invention exhibit selective rodenticidal properties and are therefore well suited for the control of destructive short-tailed mice (Microtinae).

These short-tailed mice include for example the common vole (*Microtus arvalis*), the field vole (*Microtus agrestis*), the water vole (*Arvicola terrestris*), the musk rat (*Ondatra zibethica*), and the like.

Surprisingly, the instant active compounds are generally only slightly toxic to other warm-blooded creatures, such as useful birds and domestic animals. This is also true even in the case of rodents outside the group of the short-tailed mice.

The active compounds according to the instant invention can be utilized, if desired, in the form of the usual formulations or compositions with conventional, preferably inert, (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers, optionally with the use of carrier vehicle assistants, e.g. conventional pesticide surface-active agents, including emulsifying agents and/or dispersing agents whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chloro-benzenes), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other rodenticides, or herbicides, fungicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.01–20%, preferably 0.05–5%, by weight of the mixture. Thus, the present invention contemplates overall compositions which comprises mixtures of a conventional dispersible carrier vehicle such as (1) a dispersible inert finely divided carrier solid, or (2) a dispersible carrier liquid such as an inert organic solvent and/or water, and an amount of the active compound which is effective for the purpose in question and which is generally between about 0.01–95%, and preferably 0.05–95%, by weight of the mixture.

In particular, the active compounds according to the present invention are incorporated in carrier vehicles which are in the form of the usual bait materials of animal and vegetable origin, for example cereal grains, cereal ground products, meat meal, fish meal, and the like; or in food-free play baits of paper, synthetic materials, rubber, and the like; or in drinking water; i.e. a food material for short-tailed mice or a substance which stimulates their play instinct.

Of course, the active compounds according to the present invention may be present in such bait formulations in admixture with other active compounds, if desired, as the artisan will appreciate.

Accordingly, the bait formulations contain, in general, from about 0.01–20% by weight of active compound, and preferably 0.05–5% by weight of active compound, as aforesaid.

In particular, the present invention contemplates methods of selectively killing, combating or controlling rodents, and especially short-tailed mice, which comprise applying to at least one of (a) such short-tailed mice and (b) their habitat, i.e. the locus to be protected, a rodenticidally effective or toxic amount of the particular active compound of the invention alone or together with a carrier vehicle, e.g. bait, as noted above. The instant formulations or compositions are applied in the usual manner, for instance by spraying, atomizing, vaporizing, scattering, dusting, watering, sprinkling, pouring, squirting, poisoning of drinking water, fumigation (e.g. of rooms or subterranean burrows), and the like, and particularly by strategically depositing the same incorporated in a bait, i.e. laying (above ground or below ground) food baits and play baits into which the active compound is incorporated.

It will be realized, of course, that the concentration of the particular active compound utilized, alone or in admixture with the carrier vehicle, e.g. a bait, may vary within a fairly wide range and will depend upon the intended application as the artisan will appreciate. Therefore, in special cases, it is possible to go above or below the aforementioned concentration ranges.

The outstanding selective rodenticidal effectiveness of the particular active compounds usable according to the present invention, as well as their distinct superiority compared with known products of the same type of activity or of analogous constitution, can be seen, by way of illustration and without limitation, from the following example.

EXAMPLE 1

Toxicity test/peroral

| Test animal: | Evaluation after: |
|---|---|
| Common vole (*Microtus arvalis*) | 3 days |
| Albino rat (*Rattus norvegicus*) | 7 days |
| Albino mouse (*Mus musculus*) | 3 days |
| Canary (*Serinus canarius*) | 7 days |
| Pigeon (*Columba livia*) | 7 days |

To produce a suitable preparation of the particular active compound, 3 parts by weight of such active compound are mixed with 2.8 parts by weight of highly dispersed silicic acid and 4.2 parts by weight of talc. From this concentrate of the active compound there are produced by trituration with water, with the addition of a little powdered plant gum, suspensions which contain in 1 ml. of liquid the amount of active compound to be applied per 100 g. of animal weight. Dosage is effected volumetrically after weighing of the test animals. Application is per os by means of a steel probe with a bulbous end or a plastic catheter. Evaluation takes place in each case after expiration of the period of time stated above, calculated from the application of the given active compound.

The determination of the LD$_{50}$ values (dose of active compound at which 50% of the treated animals are killed) is effected from the mortality values of the doses varied in geometrical progession in customary manner.

The particular active compounds, LD$_{50}$ values and test animals can be seen from the following Table 1. The values provided with indices are taken from the literature. The indices denote:

(1) Hüter, F.
   Anz. Schädlingskde, XXV, pp. 137–140 (1952)
(2) Hüter, F.
   Anz. Schädlingskde, XXIV, pp. 23–26 (1951)
(3) Spector, W. S.
   Handbook of Toxicology, vol. I, W. B. Saunders Comp., Philadelphia and London (1956)
(4) Brooks, J. E.
   International Pest Control 5, No. 6, pp. 21–22 (1963)
(5) Buckle, F. J., Heap, R. and Saunders, B. C.
   J. Chem. Soc., p. 912 (1949)
(6) Steiner, P. and Gruch, W.
   Mitt, Biol. Bundesanst. f. Land- u. Forstwirtsch., No. 95 (1959)
(7) Gruch, W. and Steiner, P.
   Mitt. Biol. Bundesanst. für Land- und Forstwirtsch., No. 102 (1960)
(8) DuBois, K. P., Cochran, K. W. and Thomson, J. F.
   Proc. Soc. exper. Biol. a. med. 67, pp. 169–171 (1948)
(9) Gylstorff, J.
   Bayer. Landwirtsch. Jahrbuch 39, No. 1, pp. 19–32 (1962)

TABLE 1.—TOXICITY TEST/PERORAL
[LD$_{50}$ values in mg./kg. of body weight]

| | Active compound | Albino rat | Albino mouse | Common vole | |
|---|---|---|---|---|---|
| | Known active compounds: | | | | |
| (A) | Sodium monofluroacetate | 5–7(1) | 8–10(2) | 5 | P 2.5–9 (3) |
| (B) | Monofluoroacetamide | 15 (4) | 6–10(5) | 15 | |
| (C) | 1,2,3,4,10,10-hexachloroexo-6,7-epoxy-1,4,4a,5,6,7,8,8a-octahydro-1,4, 8-endo, endo-dimethane-naphthalene. | 7.3 (6) | 8 | 8 | |
| (D) | Chlorinated camphene | 90–125 (7) | 112 (7) | 90 (7) | P 200–250 (7) |
| (E) | 2-chloro-4-methyl-6-dimethylamino-pyrimidine | 1–2 (8) | 1–2 (8) | 2 | P appro. 4 (9) |
| (F) | F—CH$_2$—CO—NH—CH(CCl$_3$)—N(CH$_3$)$_2$ | 50 | 450 | 3.75 | C <25 |
| | (German Patent 1,218,460) | | | | |
| (G) | FCH$_2$—CO—NH—CH(CCl$_3$)—NH—CH$_3$ | 56 | 150 | 5 | C 6 |
| | (German Patent 1,218,460) | | | | |
| | Active compounds according to the invention: | | | | |
| (1$_2$) | FCH$_2$—CO—NH—CH(CCl$_3$)—NH—CO—NH—CH$_3$ | 100 | 106 | 3.6 | C 113 P >250 |
| (2$_1$) | FCH$_2$—CO—NH—CO—NH—CO—NH—C$_6$H$_4$—O—C$_2$H$_5$ (with CCl$_3$) | >1,000 | >1,000 | 14.2 | C >150 |
| (3$_1$) | FCH$_2$—CO—NH—CH(CCl$_3$)—NH—CO—NH—C$_6$H$_5$ | >150 | >1,000 | 5 | P >270 |
| (4$_1$) | FCH$_2$—CO—NH—CH(CCl$_3$)—NH—CO—NH—C$_6$H$_3$Cl$_2$ | >1,000 | >1,000 | <20 | C >150 |

Note.—C=Canary; P=Pigeon.

EXAMPLE 2

$$F—CH_2—CO—NH—CH(CCl_3)—NH—CO—NH—CH_3 \quad (1_3)$$

22 g. (0.10 ml) fluoroacetylamino-trichloro-methyl-amino-methane are dissolved in 100 cc. methylene chloride, and 6 g. (0.10 mol) methyl isocyanate dissolved in 50 cc. methylene chloride are added dropwise at 15° C. A few drops of triethyl amine are added as catalyst. A white product gradually precipitates. To complete the reaction, stirring is continued for several hours at room temperature. The reaction product is filtered off with suction, dissolved in dimethyl formamide and precipitated with water.

M.P. 224° C.

Yield: 19 g. (=88% of the theory of N-(1-fluoroacetylamino-2,2,2-trichloro-eth-1-yl)-N'-methyl-urea.

In analogous manner, there are prepared:

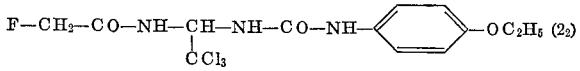

M.P. 220° C.

Yield: 38% of the theory of N-(1-fluoroacetylamino-2,2,2-trichloro-eth-1-yl)-N'-(4'-ethoxyphenyl)-urea.

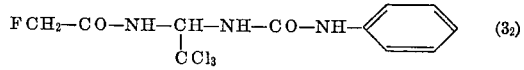

M.P. 254° C.

Yield: 80% of the theory of N-(1-fluoroacetylamino-2,2,2-trichloro-eth-1-yl)-N'-phenyl-urea.

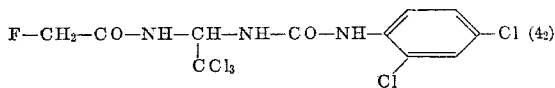

M.P. 248–250° C.

Yield: 90% of the theory of N-(1-fluoroacetyamino-2,2,2-trichloro-eth-1-yl)-N'-(2',4'-dichlorophenyl)-urea.

It will be realized by the artisan that all of the foregoing compounds contemplated by the present invention possess the desired strong and selective rodenticidal properties, i.e. for controlling and destroying selectively short-tailed mice, as well as a comparatively low toxicity toward other warm-blooded creatures, enabling such compounds to be used with correspondingly favorable compatibility with respect to such other warm-blooded creatures for more effective control and/or elimination of short-tailed mice by application of such compounds to such short-tailed mice and/or their habitat.

It will be appreciated that the instant specification and examples are set forth by way of illustration and not limitation, and that various modifications and changes may be made without departing from the spirit and scope of the present invention.

What is claimed is:

1. 1-fluoroacetylamino-2,2,2-trichloro-ethyl urea of the formula

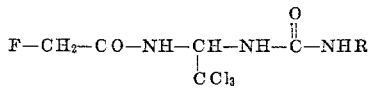

in which R is selected from the group consisting of alkyl of 1–4 carbon atoms, phenyl, alkoxyphenyl having 1–4 carbon atoms in the alkoxy moiety and chloro-substituted phenyl.

2. Compound according to claim 1 wherein R is selected from the group consisting of $C_{1-3}$ alkyl, phenyl, $C_{1-3}$ alkoxyphenyl, mono chloro-phenyl and di chloro-phenyl.

3. Compound according to claim 1 wherein R is selected from the group consisting of $C_{1-2}$ alkyl, phenyl, 4-($C_{1-3}$ alkoxy)-phenyl and 2,4-dichloro-phenyl.

4. Compound according to claim 1 wherein such compound is N-(1-fluoroacetylamino-2,2,2-trichloro-eth-1-yl)-N'-methyl-urea of the formula

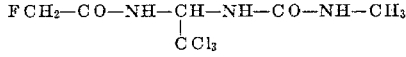

5. Compound according to claim 1 wherein such compound is N-(1-fluoroacetylamino-2,2,2-trichloro-eth-1-yl)-N'-(4'-ethoxy-phenyl)-urea of the formula

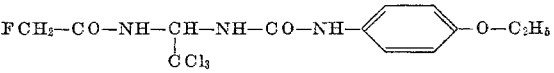

6. Compound according to claim 1 wherein such compound is N-(1-fluoroacetylamino-2,2,2-trichloro-eth-1-yl)-N'-phenyl-urea of the formula

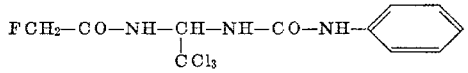

7. Compound according to claim 1 wherein such compound is N-(1-fluoroacetylamino-2,2,2-trichloro-eth-1-yl)-N'-(2',4'-dichloro-phenyl)-urea of the formula

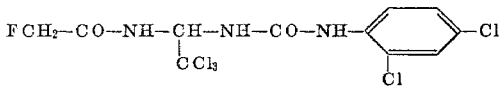

References Cited

FOREIGN PATENTS 1,218,460  12/1966  Germany.

LEON ZITVER, Primary Examiner

M. W. GLYNN, Assistant Examiner

U.S. Cl. X.R.

260—553 A; 424—322